(12) United States Patent
Vigouroux et al.

(10) Patent No.: US 8,172,402 B2
(45) Date of Patent: May 8, 2012

(54) PROJECTION SYSTEM FOR DISPLAYING AT LEAST ONE IMAGE BASED ON THREE FILTERED PRIMARY COLOURS

(75) Inventors: Jean-Ronan Vigouroux, Rennes (FR); Pascal Bourdon, Le Grand Fougeray (FR); Didier Doyen, La Debinerie (FR); Jean-Jacques Sacre, Chateaugiron (FR); Patrick Morvan, Laille (FR); Sylvain Thiebaud, Noyal sur Vilaine (FR)

(73) Assignee: Thomson Licensing, Boulogne, Billancourt (FR)

( * ) Notice: Subject to any disclaimer, the term of this patent is extended or adjusted under 35 U.S.C. 154(b) by 401 days.

(21) Appl. No.: 12/449,934

(22) PCT Filed: Feb. 20, 2008

(86) PCT No.: PCT/EP2008/052091
§ 371 (c)(1),
(2), (4) Date: Sep. 3, 2009

(87) PCT Pub. No.: WO2008/107307
PCT Pub. Date: Sep. 12, 2008

(65) Prior Publication Data
US 2010/0085491 A1   Apr. 8, 2010

(30) Foreign Application Priority Data

Mar. 5, 2007 (EP) .................................. 07300846
Mar. 13, 2007 (EP) .................................. 07300858

(51) Int. Cl.
G03B 21/00 (2006.01)
G03B 21/26 (2006.01)
H04N 9/69 (2006.01)
H04N 5/72 (2006.01)
G09G 5/02 (2006.01)
G09G 3/00 (2006.01)
G06F 3/038 (2006.01)

(52) U.S. Cl. ............ 353/31; 353/94; 348/757; 348/835; 345/604; 345/589; 345/204; 345/32

(58) Field of Classification Search ............ 353/30, 353/31, 94; 348/757, 835; 345/604, 589, 345/204, 32

See application file for complete search history.

(56) References Cited

U.S. PATENT DOCUMENTS 6,262,744 B1 * 7/2001 Carrein ..................... 345/604
6,633,302 B1 * 10/2003 Ohsawa et al. ............ 345/604

(Continued)

FOREIGN PATENT DOCUMENTS
EP          1414250        4/2004
(Continued)

OTHER PUBLICATIONS

Search Report Dated April 29, 2008 PCT/EP2008/052091.

*Primary Examiner* — Georgia Y Epps
*Assistant Examiner* — Magda Cruz
(74) *Attorney, Agent, or Firm* — Jeffrey D. Carter

(57) ABSTRACT

The invention relates to a projection system for displaying at least one visual image based on three primary colors, comprising a signal processing unit for converting said visual image into at least a visual image based on four primary colors, a frequency band being associated to each color primary, first display means for displaying three first primary colors of said visual image on a screen and second display means for displaying at least the fourth primary color of said visual image on said screen. According to the invention, the system further comprises optical filtering means that are adapted to enhance the separation between the frequency spectrum of the first three primary colors of the first display means and the frequency spectrum of the at least fourth primary color of the second display means. Application to anti-camcorder systems.

9 Claims, 6 Drawing Sheets

U.S. PATENT DOCUMENTS

| | | | |
|---|---|---|---|
| 7,018,045 B2 * | 3/2006 | Tomita | 353/31 |
| 7,393,108 B2 * | 7/2008 | Ohnishi | 353/30 |
| 2004/0081318 A1 | 4/2004 | Bilobrov et al. | |
| 2004/0113876 A1 * | 6/2004 | Motomura | 345/87 |
| 2006/0152524 A1 | 7/2006 | Miller et al. | |
| 2007/0121996 A1 | 5/2007 | Blonde et al. | |

FOREIGN PATENT DOCUMENTS

| | | |
|---|---|---|
| EP | 1416318 | 5/2004 |
| FR | 2859857 | 3/2005 |
| JP | 2006-145863 | 6/2006 |
| JP | 2006145863 A * | 6/2006 |

* cited by examiner

PROJECTION SYSTEM FOR DISPLAYING AT LEAST ONE IMAGE BASED ON THREE FILTERED PRIMARY COLOURS

This application claims the benefit, under 35 U.S.C. §365 of International Application PCT/EP2008/052091, filed Feb. 20, 2008, which was published in accordance with PCT Article 21(2) on Sep. 12, 2008 in English and which claims the benefit of European patent application No. 07300846.8, filed Mar. 5, 2007 and European patent application No. 07300858.3, filed Mar. 13, 2007.

FIELD OF THE INVENTION

The invention relates to a projection system for displaying at least one visual image based on three primary colours, comprising a signal processing unit for converting said visual image into at least a visual image based on four primary colours, a frequency band being associated to each colour primary, first display means for displaying three first primary colours of said visual image on a screen and second display means for displaying at least the fourth primary colour of said visual image on said screen. The invention relates more specifically to the problem of protecting visual images, principally films or video sequences, from unauthorized copy or duplication such as recording the output of a projector.

BACKGROUND OF THE INVENTION

WO2004/040899, US2004/081318, EP1414250, US2006/152254 disclose techniques of imperceptibly altering the spectrum of a displayed image in a manner that discourages copying from a recording device. The recording device is typically a camcorder which has spectral sensitivity that is different from the human eye. While the human eye has three types of colour photosensor cone cells that respond to incident light with one particular set of spectral component response curves, video recording devices typically use a two-dimensional array of light sensing elements that respond to a different set of three primary spectral component response curves, usually RGB (Red, Green, Blue). So, the technique disclosed in these document is to use this characteristic for altering the spectrum of the displayed image in a way that does not change the perception of the image colours by the human eye but which changes those colours in the image captured by the video recording device. The spectral power distribution of at least a colour is altered across the image or in time in a way that is metameric to the human eye but hopefully not metameric for camcorders. These alterations are not perceivable to the human eye when the images are displayed on a screen. But when these images are copied with a camcorder having different colour response characteristics than the human eye, these alterations are visible on the captured video. This characteristics enables to write a message such as "Illegal Copy" that appears on copies made in movie theatres by a camcorder. In the following description, colours having different spectral power distributions that result in a same colour perceived by the human eye are referred to as metamers.

The generation of two metamers for a given colour is rendered possible by using more than three primary colours, such as four. A projection system with three primary colours has not enough degrees of freedom to enable the creation of different metamers for one colour. The use of a fourth primary colour enables to have more than one spectral power distribution for said colour and these different spectral power distributions corresponding to metamers will be perceived as different colours by the camcorder.

The implementation of such a concept of anti-camcording based on metamerism implies to modify the current state of the art projection system based on three primary colours RGB (for Red, Green and Blue). Advantageously, additional displaying means are added to such a current state of the art projection system that are adapted to display a fourth primary colour and additional signal processing means are also added for converting the video signal based on three primary colours RGB into a signal based on four primary colours RGBP where P designates the fourth primary colour. The first display unit is generally a widely used projector with three primary colours RGB. The global frequency spectrum of these three primary colours is spread over the whole visible spectrum. On the other hand, the second display unit uses a fourth primary colour that is generally in between two of the three first primary colours. In the example of FIG. 2, the fourth primary colour P is a yellowish primary colour in between the green and red primary colours.

As the whole visible spectrum is already covered by the three first primary colours RGB, the spectral power distributions of two metamers based on such three primary colours RGB and an additional primary colour P overlapping at least one of these three primary colour can not be very different from each other and thus the colour difference between these metamers on the recorded image will not be very disturbing for the viewer.

SUMMARY OF THE INVENTION

It is an object of the present invention to alleviate this drawback. According to the invention, this object is solved by using a fourth primary colour whose spectral power distribution is decoupled from the spectral power distributions of the three other primary colours. This decoupling is achieved by adding optical filtering means to a projection system having two display means.

The invention concerns a projection system for displaying at least one visual image based on three primary colours, comprising:
  a signal processing unit for converting said visual image into at least a visual image based on four primary colours, a frequency spectrum being associated to each colour primary,
  first display means for displaying three first primary colours of said converted visual image on a screen, these three first primary colours being respectively red, green and blue, and
  second display means for displaying at least a fourth primary colour of said converted visual image on said screen, and
  optical filtering means that are located between said first and or second display means and said screen and that are adapted to enhance the separation between the frequency spectrum of the first three primary colours of the first display means and the frequency spectrum of the at least fourth primary colour of the second display means.

Thanks to these optical filtering means, the spectrum of the first three primary colours and the fourth primary colour are better disconnected to guarantee more different spectral power distributions for two metamers.

These optical filtering means are preferably adapted to better decouple and disconnect the spectral power distribution of the at least fourth primary colour from the spectral power distributions of the three first primary colours, in order to guarantee very different spectral power distributions for two metamers.

Said three first primary colours correspond preferably to the usual primary colors of a standard projection system having a usual colour gamut, and said at least fourth primary colour is preferably a non-usual primary colour. Preferably, in the CIE xy chromaticity diagram and under a D65 or a C illuminant, if $x_R$, $y_R$ are the coordinates of the red primary colour of the three first primary colours, if $x_G$, $y_G$ are the coordinates of the green primary colour of the three first primary colours, if $x_B$, $y_B$ are the coordinates of the blue primary colour of the three first primary colours, then, $x_R \geq 0.63$ and $y_R \leq 0.34$, $x_G \leq 0.31$ and $y_G \geq 0.59$, $x_B \geq 0.14$ and $y_B \leq 0.08$.

The three first primary colours correspond preferably to the three primary colours specified in a standard chosen among the group consisting of the ITU-Recommendations BT.709, NTSC 1953, PAL/SECAM.

Preferably, the fourth primary colour extends to the red limit of the visible spectrum. More precisely, said fourth primary colour of the second display means has a red colour with a frequency spectrum developing more luminous power in the range of large wavelengths that the frequency spectrum of the red primary colour of the first display means.

Preferably, the fourth primary colour extends to the red limit of the visible spectrum such that said fourth primary colour has a red colour that is "deeper" than the red primary colour of the three first primary colours. More precisely, in the CIE xy chromaticity diagram and under a D65 or a C illuminant, if $x_{R0}$, $y_{R0}$ are the coordinates of the red primary colour of the three first primary colours, if $x_{Rn}$, $y_{Rn}$ are the coordinates of the said fourth primary colour, then $x_{Rn} \geq x_{R0}$ and $y_{Rn} \leq y_{R0}$.

Thank to the use of a fourth primary colour extending to the red limit of the visible spectrum having preferably a red colour that is "deeper" than the red primary colour of the three first primary colours, the efficiency of the metameric effect can be easily enhanced.

Preferably, the optical filtering means comprise a notch filter located between said first display means and the screen to attenuate or block at least a portion of the frequencies of at least one of the three first primary colours in the frequency spectrum associated to the fourth primary colour. In an exemplary embodiment, the notch filter blocks, in the frequency spectrum associated to the fourth primary colour, the frequencies of the two first primary colours.

Advantageously, the optical filtering means further comprise a band-pass filter located between the second display means and the screen to reduce the frequency spectrum of the fourth primary colour. According to a specific feature of the invention, the size of the bandwidth of the band-pass filter is equal or lower than the size of the rejected band of the notch filter. According to a specific feature of the invention, the bandwidth of the band-pass filter and the rejected band of the notch filter are not centered on the same frequency.

The invention concerns also the use of such a projection system to generate two different spectral power distributions for a given colour in a picture displayed by the projection system.

BRIEF DESCRIPTION OF THE DRAWINGS

Exemplary embodiments of the invention are illustrated in the drawings and are explained in more detail in the following description. In the drawings.

DESCRIPTION OF PREFERRED EMBODIMENTS

To simplify the description, identical references will be used for the elements which provide the same functions in the different embodiments or examples. The invention will be described for a projection system having four primary colours but it can be easily transposed to a projection system using more primary colours.

Figure 1:
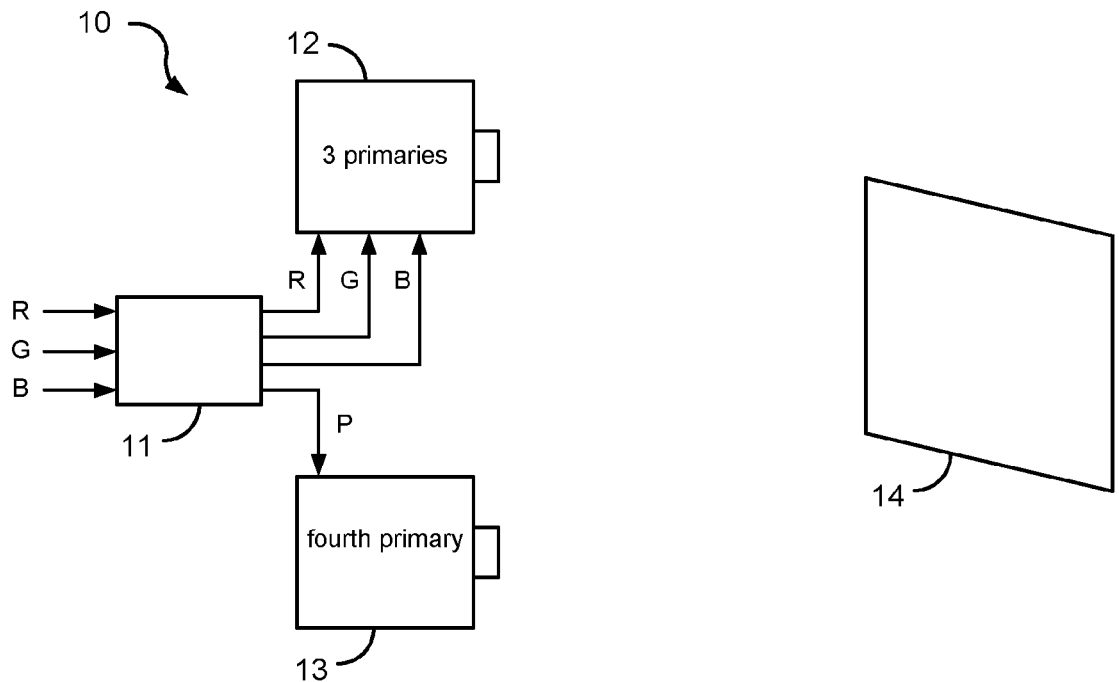
FIG. 1 illustrates a prior art projection system based on four primary colours.
Figure 7:
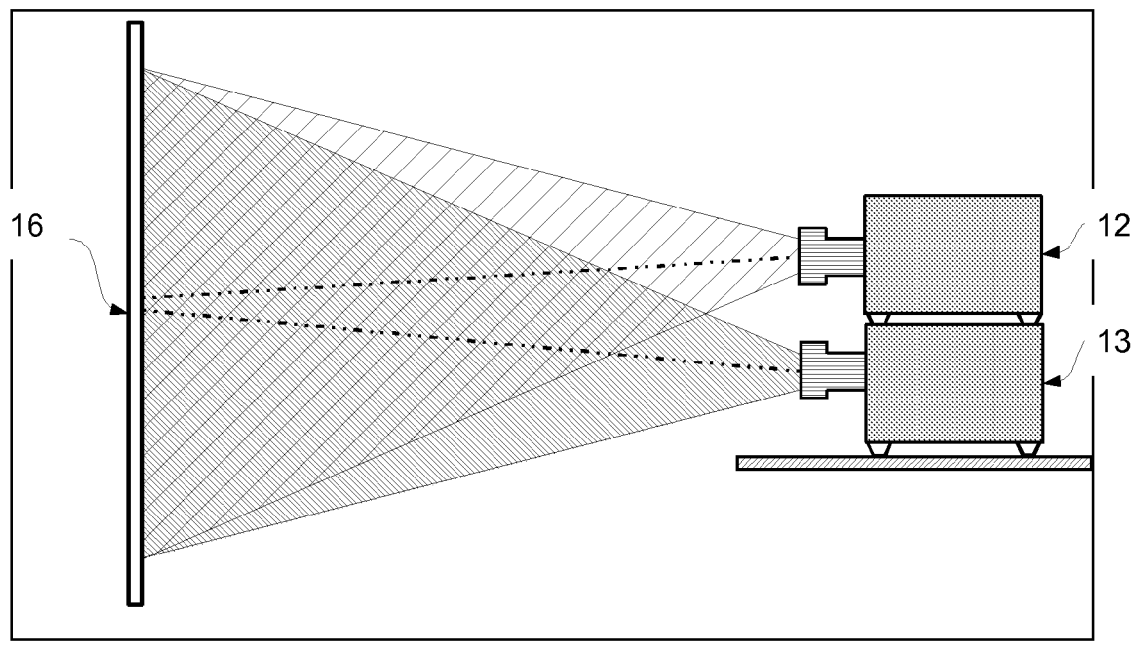
FIG. 7 illustrates in a different way the projection system of FIG. 3.

FIGS. 1 and 7 illustrates a projection system 10 comprising a signal processing unit 11 for converting a visual image based on 3 primary colours RGB into a visual image based on 4 primary colours RGBP, a first display unit 12 for displaying the first three primary colours R, G, B of the RGBP signal on a screen 14 and a second display unit 13 for displaying the fourth primary colour P of the RGBP signal on the screen 14. The signal processing of the initial RGB signal to generate the RGBP signal is described in detail in the patent application WO 2004/040899.

Figure 3:
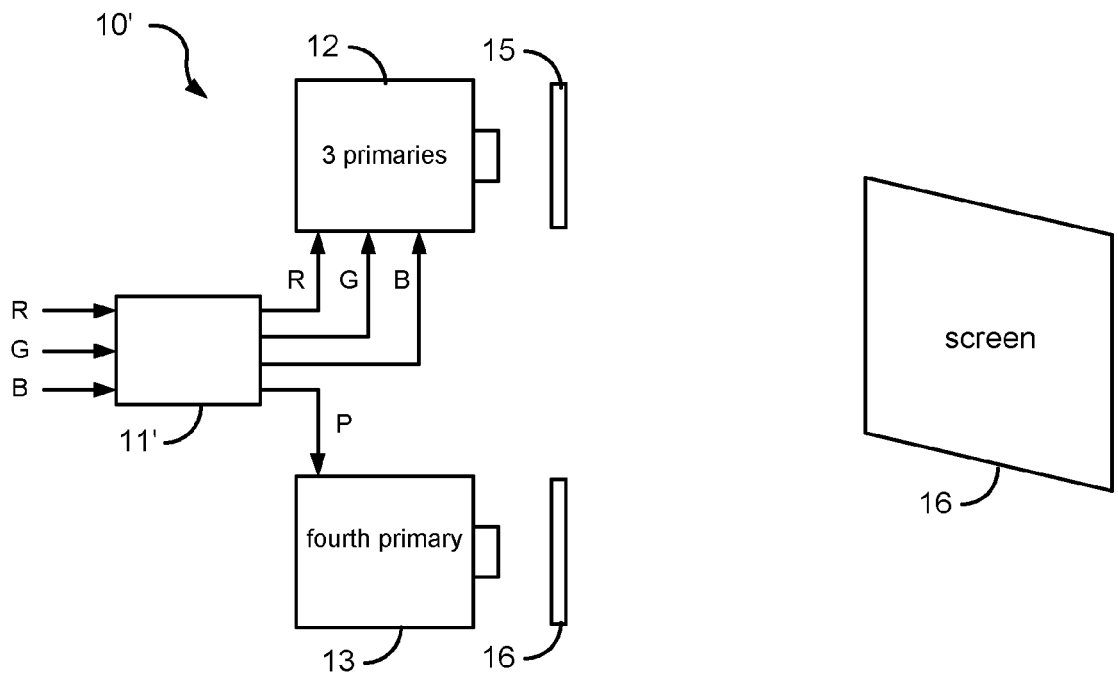
FIG. 3 illustrates a projection system based on four primary colours according to a first embodiment of the invention.

FIG. 3 illustrates a projection system 10 having optical filtering means according to a first embodiment of the invention. These optical filtering means comprises a notch filter 15 and a band-pass filter 16.

According to this embodiment of the invention, it is first proposed to introduce a notch filter between the first display unit 12 and the screen 14 to attenuate or block at least a portion of the frequencies of the three first primary colours in the frequency spectrum associated to the fourth primary colour. The notch filter is defined as a device that permits one predetermined frequency or a frequency band to pass and attenuates or blocks the frequency band outside this predetermined frequency or frequency band. The cut-off frequencies of this notch filter are neither zero nor infinite. This notch filter is also called pass-reject filter.

The notch filter 15 is inserted between the first display unit 12 and the screen 14. The function of the notch filter 15 is to block or attenuate at least a portion of the frequencies in the frequency spectrum of the primary colour P, i.e. frequencies or a frequency band in the frequency spectrum corresponding to the spectrum [535 nm, 620 nm]. So it blocks the frequencies of the primary colours G and R.

As illustrated in FIG. 3, the optical filtering means comprises also advantageously a band-pass filter 16 to reduce the spectrum of the primary colour P. This band-pass filter is inserted between the second display unit 13 and the screen 14 and its bandwidth is lower or equal to the rejected band of the notch filter 15. The band-pass filter 16 is for example designed to pass the frequencies corresponding to the range [565 nm, 580 nm]. In this embodiment, the rejected band of the notch filter can thus be reduced from [535 nm, 620 nm] to [560 nm, 600 nm].

Figure 2:
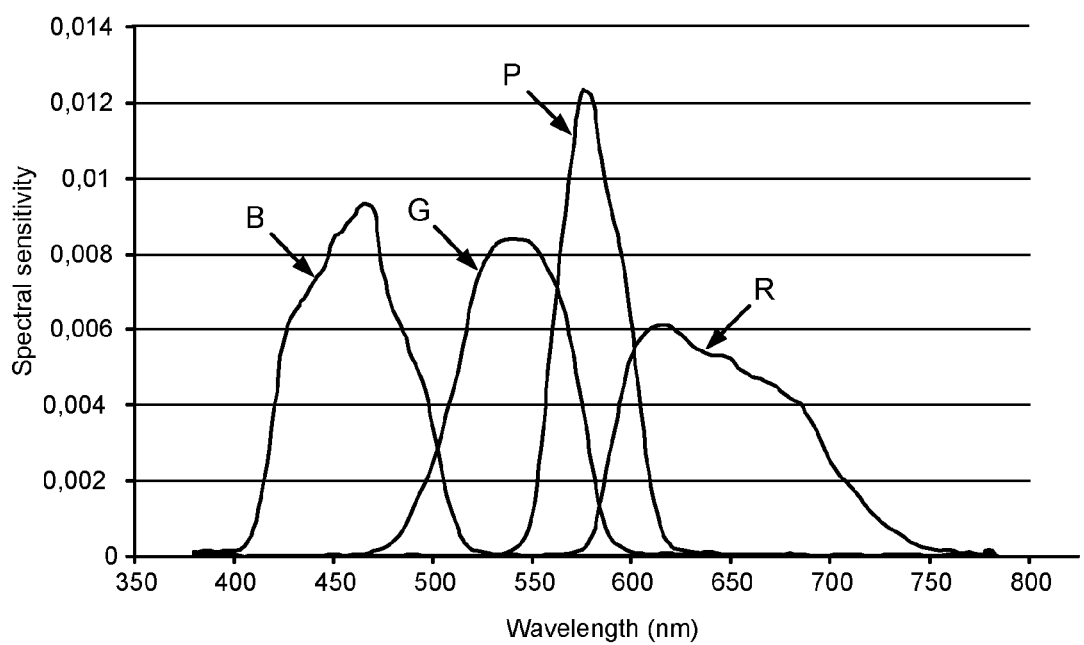
FIG. 2 illustrates spectral power distributions of the four primary colours of the projection system of FIG. 1.

An example of spectral power distributions for four primary colours red R, green G, blue B, and P is given in FIG. 2. The spectral power distribution of the primary color B is comprised between 400 nanometers (nm) and 520 nanometers (nm). The spectral power distribution of the primary color G is comprised between 470 nanometers (nm) and 600 nanometers (nm). The spectral power distribution of the primary color R is comprised between 570 nanometers (nm) and 750 nanometers (nm). The first three primary colours R, G, B corresponds to the usual primary colours of a standard projection system. And the spectral power distribution of the additional primary color Y is comprised between 535 nanometers (nm) and 620 nanometers (nm), i.e. between the spectral power distribution of the primary color B and the spectral power distribution of the primary color G.

The additional primary colour P allows the generation of multiple spectral power distributions that are perceived as the same colour by the human eye but result in different values in the video sequence recorded by a camcorder. The additional primary colour P allows the generation of metameric colours, i.e. colours having approximately the same coordinates in a visual color space although having different spectral power distributions.

Figure 4:
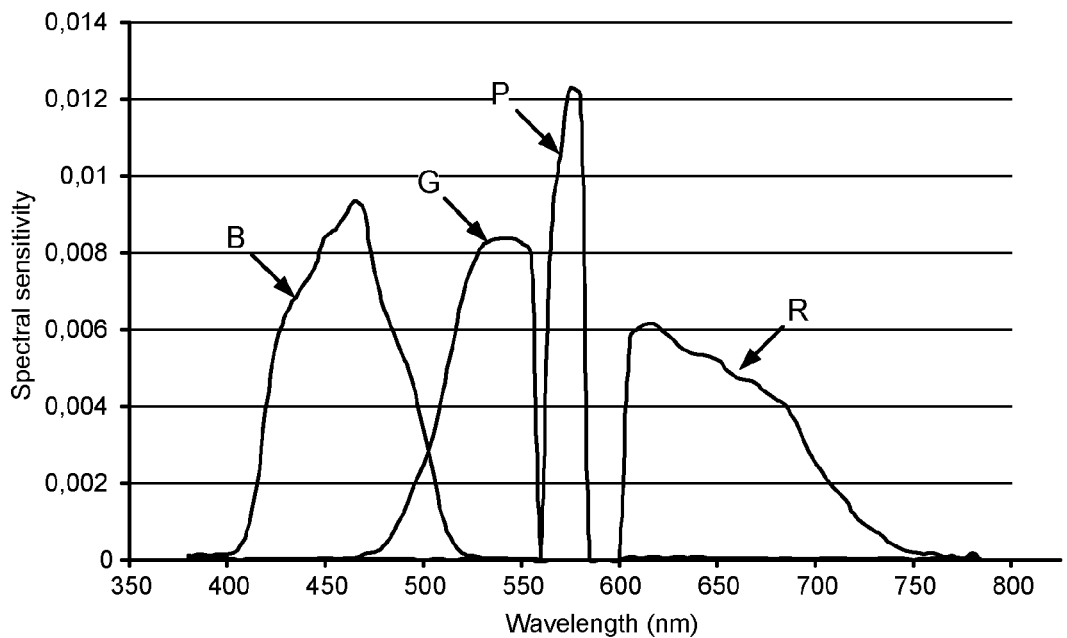
FIG. 4 shows an example of spectral power distributions of the four primary colours of the projection system of FIG. 3.

An example of spectral power distribution of the four primary colours R, G, B, P that is obtained after filtering with the optical filtering means is given in FIG. 4. The spectral power distribution of the four primary colours R, G, B, P that would be obtained without the optical filtering means is given in FIG. 2. By comparison, it can be seen that:

The spectral power distribution of the primary color B is unchanged, i.e. not affected by the optical filtering means.

The spectral power distribution of the primary color G is changed and reduced, notably by the notch filter 15 to [470 nm, 565 nm].

The spectral power distribution of the primary color R is also changed and reduced, notably by the notch filter 15 to [600 nm, 750 nm].

Finally, the spectral power distribution of the additional primary color Y is also changed to [565 nm, 580 nm].

In conclusion of this comparison, the optical filtering means according to the invention allow advantageously to disconnect and better separate the spectrum of the first three primary colours RGB and the fourth primary colour P in order to enhance the metameric effect, i.e. to guarantee very different spectral power distributions for two metameric colours.

Figure 5:
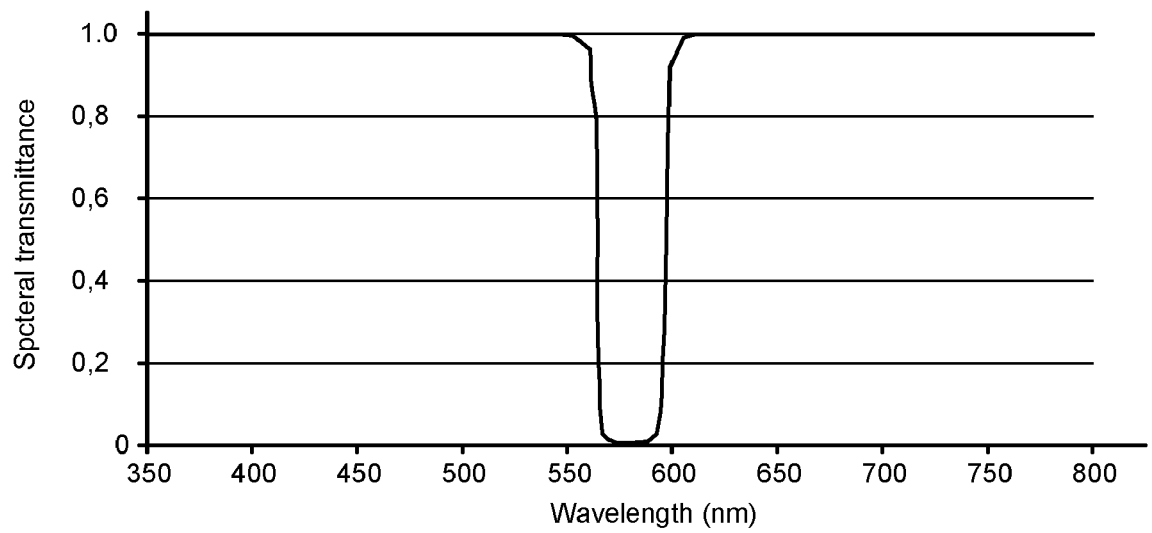
FIG. 5 shows a response curve of the notch filter of the projection system of FIG. 3.
Figure 6:
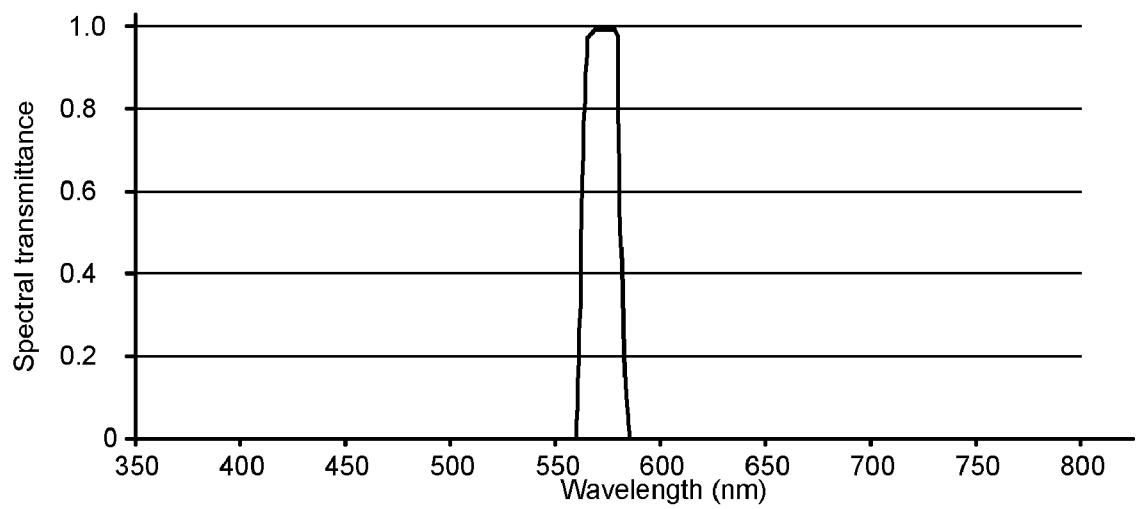
FIG. 6 shows a response curve of the band-pass filter of the projection system of FIG. 3.

The response curve of the notch filter 15 and the band-pass filter 16 of the optical filtering means are illustrated by FIGS. 5 and 6. The notch filter stops the light in the band [565 nm, 600 nm]. The pass band filter lets the band [565 nm, 580 nm] pass. It has to be noted that, in the examples given here, the bandwidth of the band-pass filter 16 and the rejected band of the notch filter 15 are not centered on the same frequency but this is not mandatory.

The effect of the filters 15 and 16 on the displaying on the screen is of course taken into account in a manner known per se for the computation carried out by the signal processing unit 11.

Figure 12:
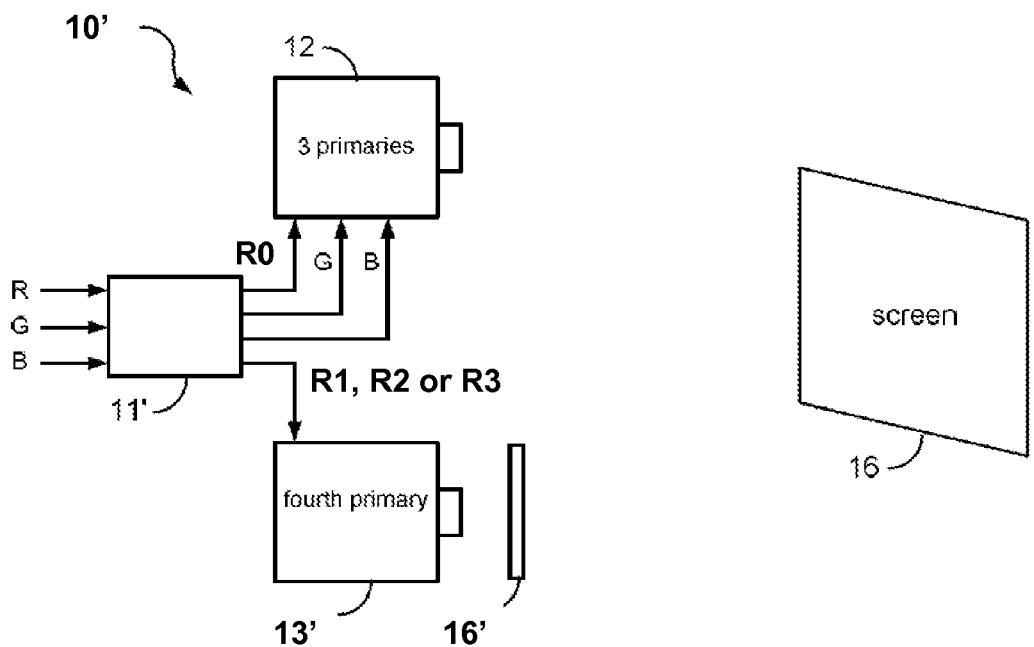
FIG. 12 illustrates a projection system based on four primary colours according to a second embodiment of the invention.

FIG. 12 illustrates a projection system 10' having optical filtering means according to a second embodiment of the invention. This projection system 10' is identical to the previous projection system 10 except that the optical filtering means comprises now a low-pass filter 16' that is inserted between the second display unit 13 and the screen 14, with no notch filter between the first display unit 12 and the screen 14.

The first display unit 12 is identical to the first display unit 12 of the first embodiment. Then, the spectral power distributions of the first three primary colours red R0, green G, blue B of the first display unit 12 is similar to the spectral power distributions for the first three primary colours red R, green G, blue B of the first embodiment.

The second display unit 13' is adapted to emit a red colour with a frequency spectrum developing more luminous power in the range of large wavelengths that the frequency spectrum of the red primary colour R0 of the first display unit 12.

Figure 11:
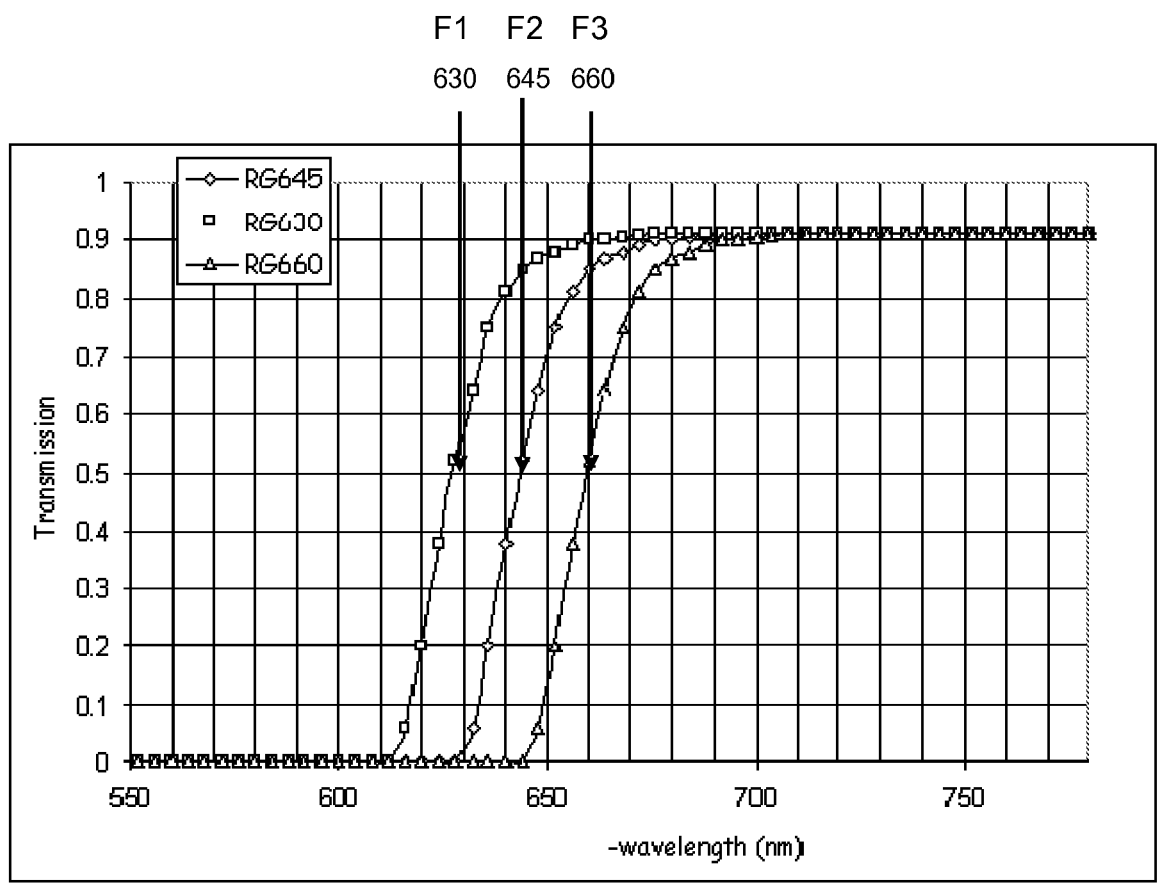
FIG. 11 shows the transmission curves of the low-pass filters that can be used in the projection system of FIG. 12.

The low-pass filter 16' is adapted to reduce the spectrum of the additional primary colour R1, R2 or R3 in the lower wavelength range, in order to disconnect and better separate the spectrum of the first three primary colours R0, G, B and the fourth primary colour R1, R2 or R3 and in order to enhance the metameric effect. Three possible low-pass filters F1, F2, F3 are proposed for this second embodiment, the transmission curves of which are illustrated on FIG. 11. These low-pass filters F1, F2, F3 are made of sulfide or selenide glasses. So-called RG or LG filters of the SCHOOT Company may be used for this purpose. By using glass for these red filters, the problem of the variation of filter characteristics with the incident angle may be avoided.

Figure 8:
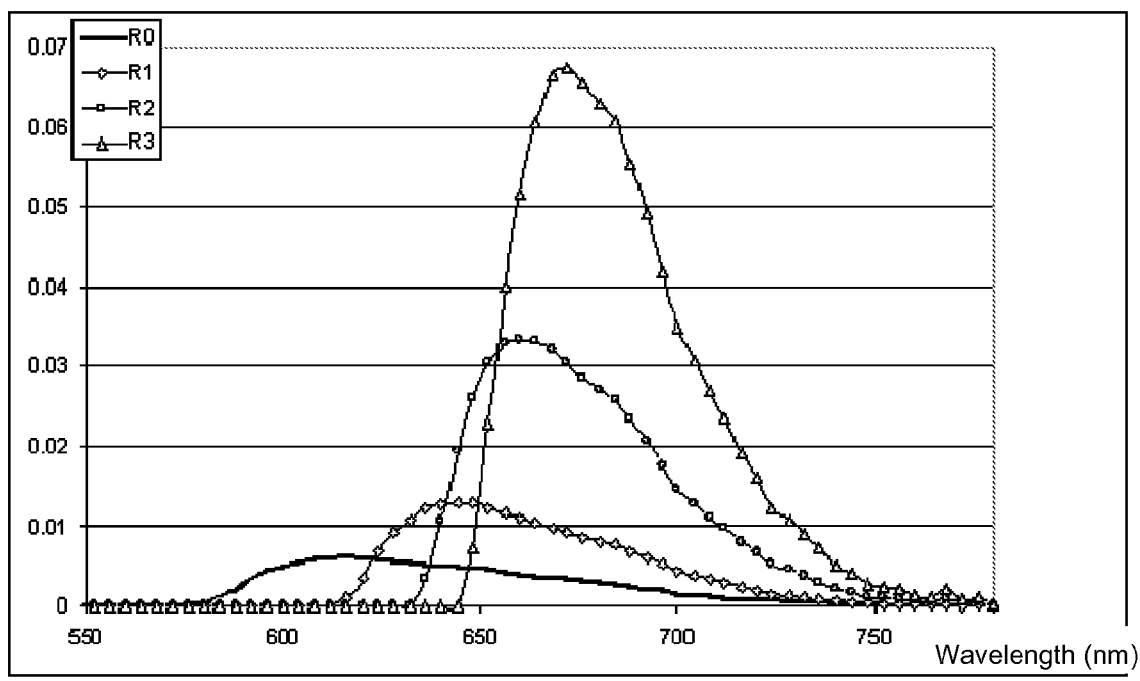
FIG. 8 illustrates different examples of spectral power distribution of the fourth primary colour of the projection system of FIG. 12.

FIG. 8 illustrates the spectral power of the fourth primary colour R1, R2, or R3 that is obtained after filtering the red emission of the second display unit 13' respectively by the F1, F2 or F3 low-pass filter. The spectral power distribution for the unfiltered red primary R0 of the first display unit 12 is also illustrated for comparison.

As for the first embodiment, the additional primary colour R1, R2 or R3 allows the generation of multiple spectral power distributions that are perceived as the same colour by the human eye but result in different values in the video sequence recorded by a camcorder. As camcorder are generally far more sensitive to red and infra-red wavelengths than the human eye, using the deep red colors to produce metameric jamming will be very efficient. FIG. 8 gives an example of the spectral distributions of the various primaries R1, R2, R3 that may be used to produce enhanced metameric jamming. WO2006/076174, already quoted, discloses using also a deep red wavelength at about 630 nm for metameric jamming of images, but the other three basic primaries do not comprise the usual red, green and blue primary colours of the first display unit 12 of the invention.

The efficiency of the metameric jamming of images will now be evaluated for this second embodiment.

A same given grey colour is generated by the projection system in four different ways as follows:
1) by using only the first three primary colours R0, G, B of the first display unit 12;
2) by using only the green and the blue primary colours G, B of the first display unit 12, and the fourth additional primary colour R1, R2, or R3 of the second display unit 13', with respectively the corresponding low-pass filter F1, F2, or F3.

Four cases for displaying the same grey colour have then to be considered with their corresponding inputs delivered by the signal processing unit 11:

R0 case: inputs will be: R0=0.5, G=0.5, B=0.5, R1=R2=R3=0.0;

R1 case: inputs will be: R0=0.0, G=0.54, B=0.499, and R1=1.86;

R2 case: inputs will be: R0=0.0, G=0.547, B=0.498, and R2=5.215;

R3 case: inputs will be: R0=0.0, G=0.551, B=0.499, and R3=14.151.

Projecting on the screen 14 the grey colour according to anyone of these four cases above generates the same grey colour for the human eye, but will not produce the same grey colour for a typical camcorder as exemplified below.

Figure 9:
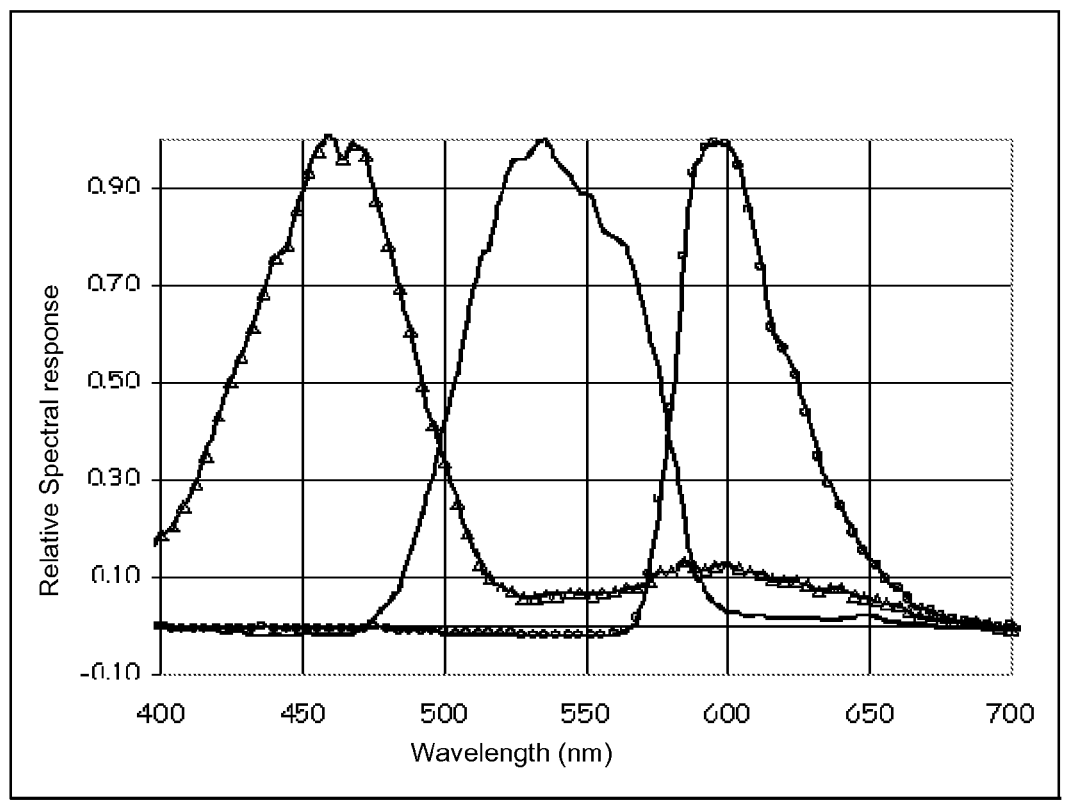
FIG. 9 illustrates the relative spectral response of the three channels of a typical camcorder.
Figure 10:
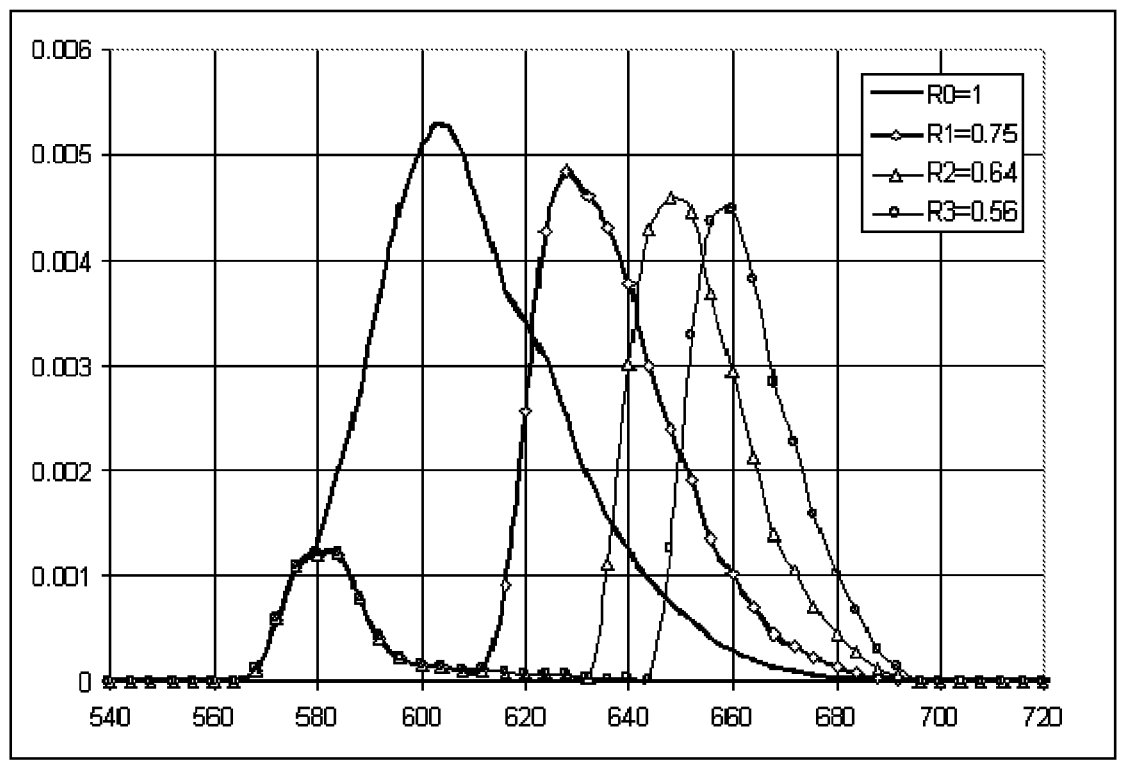
FIG. 10 shows the red output of a typical camcorder for the different red primaries R0, R1, R2, R3 of the projection system 10 of FIG. 12 for the different fourth primary colours of FIG. 8.

A typical spectral relative response of a "JVC Pro" type camcorder is illustrated on FIG. 9 for its three channels or basic outputs R', G', B'. FIG. 10 illustrates the red output of this camcorder for the different red primaries R0, R1, R2, R3 of the projection system 10' with the different filters F1, F2, or F3.

For the four displaying cases above, the corresponding following outputs are delivered when using this camcorder to capture the same grey coulour:

R0 case: outputs are: R'=128, G'=128, B'=128;
R1 case: outputs are: R'=95, G'=136, B'=130;
R2 case: outputs are: R'=80, G'=137, B'=133;
R3 case: outputs are: R'=69, G'=135, B'=133.

The corresponding coordinates X', Y', Z' of these outputs are calculated in the 1931 XYZ visual color space:

R0 case: X'=20.5175, Y'=21.5861, Z'=23.5072;
R1 case: X'=17.5768, Y'=21.6713, Z'=24.5086;
R2 case: X'=16.4751, Y'=21.3294, Z'=25.3187;
R3 case: X'=15.0309, Y'=20.1678, Z'=25.2694.

These X', Y', Z' values of the 1931 XYZ visual color space are converted into L*', a*', b*' values of the Lab color space. By comparison with the L*, a*, b* values of the grey colour as displayed on the screen 16, a so-called Euclidian colour difference ΔE is calculated for each case, using the known formula:

$$\Delta E = \sqrt{(L^{*\prime} - L^*_{disp})^2 + (a^{*\prime} - a^*_{disp})^2 + (b^{*\prime} - b^*_{disp})^2},$$

where $L^*_{disp}$, $a^*_{disp}$, $b^*_{disp}$ values correspond, in the Lab color space, to the coordinates of the same grey colour as displayed on the screen 16 in any of the four cases above. The values of the Euclidian distance ΔE are then as follows:

R0 case: ΔE=0, because there is no metameric jamming;
R1 case: ΔE=15;
R2 case: ΔE=20;
R3 case: ΔE=22.

If we consider that as soon as ΔE≧0.5, the colour difference can be perceived by the human eye, it means that a very significant metameric jamming is obtained for the R1, R2 or R3 cases.

The values of the Euclidian distance ΔE have been similarly calculated for another camcorder of the CANON Company, model MVX10ei:

R0 case: ΔE=0, because there is no metameric jamming;
R1 case: ΔE=10;
R2 case: ΔE=15;
R3 case: ΔE=21.

The values of the Euclidian distance ΔE have been similarly calculated for still another camcorder of the CANON Company, model Obtura 500:

R0 case: ΔE=0, because there is no metameric jamming;
R1 case: ΔE=10;
R2 case: ΔE=10;
R3 case: ΔE=12.

All the results above evidence the efficiency of the metameric effect that can be obtained when a "deep" red additional primary R1, R2 or R3 is used to display images. Such an efficiency is also obtained when $x_{Rn} \geq x_{R0}$ and $y_{Rn} \leq y_{R0}$, where $x_{R0}$, $y_{R0}$ are the coordinates of the red primary colour of the three first primary colours, where $x_{Rn}$, $y_{Rn}$ are the coordinates of the said fourth primary colour, in the CIE xy chromaticity diagram and under a D65 or a C illuminant.

Of course, the present invention is not limited to a fourth primary color consisting in a single peak. Should the fourth primary colour have more than one peak, additional notch filters will be inserted between the first display unit and the screen. Should the fourth primary colour extend to the limits, red or blue, of the visible spectrum, corresponding high-pass or low-pass filters will be inserted between the first display unit and the screen.

Otherwise, the present invention is not limited to a projection system having four primary colours. It can be applied to projection systems having more primary colours. If the projection system comprises six primary colours with a first display unit using three first primary colours and a second display unit using the three other primary colours, the notch filter will be inserted between the first or second display unit and the screen and the band-pass filter will be inserted between the other display unit and the screen.

While the invention has been described with reference to exemplary embodiments, it will be understood by the man skilled in the art that various changes may be made and equivalents may be substituted for elements thereof without departing from the scope of the invention.

The invention claimed is:

1. A projection system for displaying at least one visual image based on three primary colours, said projection system comprising:

a signal processing unit for converting said visual image into a visual image based on at least four primary colours, a frequency spectrum being associated to each primary colour;

first display means for displaying three first primary colours of said converted visual image on a screen, said three first primary colours being respectively red, green and blue;

second display means for displaying at least a fourth primary colour of said converted visual image on said screen; and optical filtering means that are located between said first and or second display means and said screen and that are adapted to enhance the separation between the frequency spectrum of the three first primary colours of the first display means and the frequency spectrum of the at least fourth primary colour of the second display means, wherein said optical filtering means comprises a notch filter located between said first display means and the screen to attenuate or block at least a portion of the frequencies of at least one of the three first primary colours in the frequency spectrum associated to the fourth primary colour.

2. The projection system according to claim 1 wherein, in a CIE xy chromaticity space and under a D65 or a C illuminant, if $x_R$, $y_R$ are the coordinates of the red primary colour of the three first primary colours, if $x_G$, $y_G$ are the coordinates of the green primary colour of the three first primary colours, if $x_B$, $y_B$ are the coordinates of the blue primary colour of the three first primary colours, then, $x_R \geq 0.63$ and $y_R \geq 0.34$, $x_G \leq 0.31$ and $y_G \geq 0.59$, $x_B \geq 0.14$ and $y_B \leq 0.08$.

3. The projection system according to claim 1, wherein said fourth primary colour of the second display means has a red colour with a frequency spectrum developing more luminous power in the range of large wavelengths that the frequency spectrum of the red primary colour of the first display means.

4. The projection system according to claim 1, wherein, in a CIE xy chromaticity space and under a D65 or a C illuminant, if $x_{R0}$, $y_{R0}$ are the coordinates of the red primary colour of the three first primary colours, if $x_{Rn}$, $y_{Rn}$ are the coordinates of the said fourth primary colour, then $x_{Rn} \geq x_{R0}$ and $y_{Rn} \leq y_{R0}$.

5. The projection system according to claim 1, wherein, the notch filter blocks, in the frequency spectrum associated to the fourth primary colour, frequencies of two of the three first primary colours.

6. The projection system according to claim 1, wherein said optical filtering means further comprises a band-pass filter located between said second display means and the screen to reduce the frequency spectrum of the fourth primary colour.

7. Use of the projection system according to claim 1 to generate two different spectral power distributions for a given visual colour in a picture displayed by said projection system.

8. A display system, comprising:
means for converting a visual image based on three primary colours into a visual image based on at least four primary colours, wherein a frequency spectrum is associated with each of said primary colours;
first means for enabling display of three first primary colours of said converted visual image on a screen, said three first primary colours being respectively red, green and blue;
second means for enabling display of at least a fourth primary colour of said converted visual image on said screen; and
a notch filter positioned between said first display enabling means and said screen to attenuate or block at least a portion of the frequencies of at least one of said three first primary colours in the frequency spectrum associated with said fourth primary colour.

9. A method, comprising:
converting a visual image based on three primary colours into a visual image based on at least four primary colours, wherein a frequency spectrum is associated with each of said primary colours;
enabling display of three first primary colours of said converted visual image on a screen, said three first primary colours being respectively red, green and blue;
enabling display of at least a fourth primary colour of said converted visual image on said screen; and
providing a notch filter between means for enabling display of said three first primary colours and said screen to attenuate or block at least a portion of the frequencies of at least one of said three first primary colours in the frequency spectrum associated with said fourth primary colour.

* * * * *